(12) United States Patent
Pelland et al.

(10) Patent No.: US 6,471,803 B1
(45) Date of Patent: *Oct. 29, 2002

(54) ROTARY HOT AIR WELDER AND STITCHLESS SEAMING

(76) Inventors: Ray Pelland, 1175 S. Discovery Rd., Port Townsend, WA (US) 98368; Christopher K. Chambers, 714 Selkirk Rd., Sandpoint, ID (US) 83864; David R. Gahr, P.O. Box 245, Naples, ID (US) 83847

( * ) Notice: Subject to any disclaimer, the term of this patent is extended or adjusted under 35 U.S.C. 154(b) by 0 days.

This patent is subject to a terminal disclaimer.

(21) Appl. No.: 09/556,277

(22) Filed: Apr. 24, 2000

Related U.S. Application Data

(63) Continuation-in-part of application No. 08/957,287, filed on Oct. 24, 1997, now Pat. No. 6,053,230.

(51) Int. Cl.[7] ............................................. B32B 35/00
(52) U.S. Cl. ..................... 156/64; 156/82; 156/272.8; 156/304.3; 156/304.6; 156/359; 156/361; 156/367; 156/378; 156/497; 156/499; 156/555
(58) Field of Search ........................... 156/64, 82, 157, 156/272.2, 272.8, 304.1, 304.3, 304.6, 359, 361, 367, 378, 497, 499, 555; 428/58

(56) References Cited

U.S. PATENT DOCUMENTS

| | | | |
|---|---|---|---|
| 2,060,906 A | * 11/1936 | Snyder | 154/42 |
| 3,530,027 A | * 9/1970 | Nuckols | 156/582 |
| 3,775,222 A | * 11/1973 | Aspin et al. | 156/497 |
| 3,804,697 A | * 4/1974 | Jacobi | 156/582 |
| 3,951,050 A | * 4/1976 | Poole | 93/35 R |
| 3,962,016 A | * 6/1976 | Alfter et al. | 156/304 |
| 4,070,222 A | * 1/1978 | Olson | 156/251 |
| 4,379,114 A | * 4/1983 | Fujiki et al. | 264/248 |
| 4,435,457 A | * 3/1984 | Servo et al. | 428/58 |
| 4,447,288 A | * 5/1984 | Seaman | 156/574 |
| 4,655,870 A | * 4/1987 | Mori et al. | 156/285 |
| 4,769,102 A | * 9/1988 | Neumuller et al. | 156/359 |
| 4,834,827 A | * 5/1989 | Obeda | 156/352 |
| 4,855,004 A | * 8/1989 | Chitjian | 156/359 |
| 4,872,941 A | * 10/1989 | Lippman et al. | 156/497 |
| 4,909,870 A | * 3/1990 | Gould et al. | 156/66 |
| 4,950,352 A | * 8/1990 | Greller | 156/497 |
| 5,320,698 A | * 6/1994 | Fournier et al. | 156/159 |
| 5,466,326 A | * 11/1995 | Cherney | 156/359 |
| 5,472,755 A | * 12/1995 | Nibling, Jr. | 428/40 |
| 5,616,199 A | * 4/1997 | Jurrius et al. | 156/64 |
| 5,816,019 A | * 10/1998 | Saget et al. | 53/373.9 |
| 5,853,511 A | * 12/1998 | Fairbanks | 156/71 |
| 6,053,230 A | * 4/2000 | Pelland | 156/359 |
| 6,129,809 A | 10/2000 | Ellenberger et al. | 156/351 |

OTHER PUBLICATIONS

Smart Seal Sales literature for SmartSeal AP Rotary Hot Air Welder and SmartSeal SP Rotary Hot Air Welder (1 page); published 1998–1999, by Pelland Industries (now Seamtek International, Inc.).

* cited by examiner

Primary Examiner—James Sells
(74) Attorney, Agent, or Firm—Ostrager Chong & Flaherty LLP

(57) ABSTRACT

The present invention provides a hot air welding apparatus that provides accurate and repeatable control of the drive wheel speed. To afford very precise control of the speed and the relative rotation of the drive wheels at all times during the welding process, the present invention is provided with a computer control system and two high torque stepper motors, one for each drive wheel. The computer control system allows the speed and position of the drive wheels to be regulated with a very high accuracy. The computer control system allows the drive wheel settings to be adjusted while the seam is being welded and further includes an automatic ramp capability, a repeat mode, and a test strip mode. Further, the computer control system is capable of controlling the temperature of the air used in the welding process. The present invention further provides methods of joining pieces of fabric, films and extruded materials without using traditional sewing techniques and further provides products seamed by such methods.

38 Claims, 11 Drawing Sheets

ROTARY HOT AIR WELDER AND STITCHLESS SEAMING

This is a continuation-in-part application of U.S. patent application Ser. No. 08/957,287, filed Oct. 24, 1997, which issued on Apr. 25, 2000, as U.S. Pat. No. 6,053,230.

BACKGROUND OF THE INVENTION

This invention relates generally to apparatuses and methods for joining materials and the products created by the joining methods. More particularly, the invention relates to apparatuses and methods for welding pieces of industrial textiles, such as thermoplastic materials or thermoplastic coated fabrics, together. The invention further relates to joining, by welding or with adhesive tape, fabrics intended for use in the garment industry, particularly the outdoor technical clothing industry, without employing traditional sewing techniques to join fabric pieces.

The industrial textile industry is based on the availability of a variety of thermoplastic extruded sheeting and thermoplastic coated fabrics. These materials are used to make a wide range of products such as, for example, inflatable boats, hot air balloons, covers for outdoor structures, geomembranes for lining toxic waste sites, awnings and tents, outdoor banners, artistic fabric sculptures, liquid transportation containers, dry bags, and waterproof storage sacks. The products are generally lightweight, can be folded to a small size when not in use, have coatings that are generally impervious to industrial chemicals, and can be purchased in a wide range of colors, textures and fabric weights. Such fabrics generally come in approximately 5 to 12 foot wide rolls and thus must be cut into the required pattern pieces before being joined together to make the completed product.

There are three basic methods by which pieces of coated fabric can be joined together to create a mechanical bond as well as water-tight and gas tight seams: traditional sewing followed by applying waterproof tape to the seam, gluing, and heat sealing (also called welding). Fabrics coated with certain rubber based coatings, such as Hypalon (manufactured by DuPont) can only be glued or sewn. Most of the newer coatings including polyurethane, polyvinylchloride, polypropylene, and polyethylene can either be glued or welded. However, gluing can be very labor intensive and further is subject to strict scrutiny from the Occupational Safety and Health Administration ("OSHA") due to the volatile solvents that are employed during the gluing operation. Most gluing now takes place in countries other than the United States.

There are four main methods of heat sealing or welding in use: hot wedge, radio frequency ("RF"), ultrasonic, and hot air. In the hot wedge method, two fabric pieces are drawn across a hot iron (or wedge) and then are pressed together. This method is quite similar to the hot air process with only the heat delivery system being different. One disadvantage of this method is that the wedge can become contaminated with dirt and melted plastic which then reduces the amount of heat delivered to the seam. Further, hot wedge welders typically experience a hot section immediately after the beginning of the weld as the wedge accumulates excess heat when idle. Another disadvantage is that, since the heat energy must pass through a solid object to reach the seam, the maximum speed of the hot wedge welding process is limited by the thermal conductivity of the wedge.

The RF method is probably the most widely used approach for heat sealing. The RF welder is basically an antenna (the die) that is poorly matched to the amplifier, thereby producing a great deal of heat rather than radio waves between the antenna and the underlying plate. In practice, the two fabric pieces are laid on the plate. The die is then brought down, thereby pressing the two pieces together. The operator then initiates the welding process by pressing a pair of push buttons. The actual RF process takes from about 5 to 15 seconds, depending upon the thickness of the pattern pieces and the amount of RF energy available from the machine.

There are, however, several disadvantages to the RF method. RF welding is a slow process because the size of the die is limited by the available energy of the unit. Typical RF welding dies are about 1 to 3 feet in length and approximately 2 inch wide. There is also some concern about the operator's health and safety as the operator is usually inches from an intense RF source which may be activated several hundred times in a typical shift. While RF health hazards have not been documented, it is known that stray RF energy from such machines can damage electrical equipment within approximately 50 feet of the machine and can light fluorescent fixtures located nearby. In addition, due to the die and plate arrangement, the RF method is typically limited to seams or joints that can be laid flat for welding. Three dimensional dies and plates are occasionally used, but are quite expensive and require a vacuum or other methods to hold the fabric in position as the die is applied. Further, the Federal Communications Commission ("FCC") has become increasingly strict regarding emissions of stray RF energy from industrial sources. Because of the increasingly strict FCC regulations, new RF welding equipment can typically cost $80,000 or more.

Ultrasonic welding is a process that is like RF welding, with the exception of the energy source. Rather than using radio waves, ultrasonic welding uses sound waves that basically vibrate the fabric molecules until sufficient heat is generated to melt the coatings.

In general, hot air welding is much faster than other methods, can accommodate three dimensional patterns, and requires no dies or tooling. In a hot air welder, the flow of hot air that floods the seam is not subject to contamination, as with the wedge welder, and there is no initial drop off of heat at the beginning of the seam. Most fabricators want the speed of hot air technology, but have felt that it is difficult to obtain consistent results for many types of coated fabrics and also that it requires highly trained operators.

The typical rotary hot air welding apparatus uses hot air to join together two pieces of plastic coated fabric. The welder first injects a stream of hot air from a hot air nozzle between the two pieces of coated fabric. The temperature of the hot air can be set in the range of approximately 500 to 1350 degrees F. The fabric pieces are then pinched between and pulled through the apparatus by two drive wheels. The distance from the hot air nozzle and the pinch point between the two wheels is in the range of approximately 0.5 to 0.75 inch. The wheel speed determines how long the fabric is exposed to the hot air stream before it passes between the wheels. With a constant air temperature, the amount of heat energy delivered to the fabric is inversely proportional to the wheel speed; a faster speed decreases the exposure and vice versa.

Commercial hot air welders currently available on the market have a number of shortcomings. One shortcoming is the lack of accurate control of the speed of the two drive wheels. If the wheel speed varies from the required speed, then the amount of heat delivered to the seam will vary. Too much heat supplied to the weld results in burnt fabric while too little heat results in cold welds or unwelded fabric.

The problem of providing accurate wheel speed is compounded by the need to control both wheels independently. For some fabric patterns, especially patterns with curves, one wheel may need to run slightly slower or faster than the other wheel. Commercial hot air welders typically use a single DC motor with a variable speed (voltage) amplifier. The drive energy from the motor passes through a long series of chains and pulleys to the bottom drive wheel. The drive energy to the top drive wheel first passes through a variable diameter pulley transmission that provides adjustment for the relative wheel speed and then passes through a similar set of chains and pulleys.

This arrangement is fairly inaccurate and is not easily or consistently repeatable. With any particular speed setting, the actual wheel speed can vary with both the temperature of the amplifier and the motor windings and with the load on the motor. This is typical of a DC drive system in which there is no feedback to the motor.

Further, the variable diameter pulley that provides differential speed control is an inherently inaccurate mechanical device. The same differential speed setting is not repeatable between consecutive seams. In view of the inaccurate DC drive system and the variable speed transmission for the drive wheels, wheel speed adjustment and calibration are constant problems. These problems are particularly evident when thinly coated fabrics are being welded and where the amount of heat energy delivered to the seam must lie within a narrow range.

In addition, the inaccurate control of the wheel speed results in the two edges of the fabric being joined not "in registration." In other words, at the end of the seam, one piece is shorter or longer than the other piece. Such an occurrence effects the overall quality of the product being made and is especially likely to occur when two different types of fabrics, with, for example, different elastic qualities, are joined together.

Thus, there is a need for a hot air welding apparatus and welding method that provides accurate control of the drive wheel speed and, consequently, accurate control of the amount of heat applied to the seam. There is a further need for a hot air welding apparatus and method that provides a differential speed setting that is repeatable between consecutive seams and that allows the drive wheel settings to be adjusted while the seam is being welded. In addition, there is a need for a hot air welding apparatus and method that joins the edges of two pieces of fabric "in registration."

Further, generally, pieces of fabric which are joined for the manufacture of technical outdoor "waterproof" type clothing are stitched together to form seams. This type of seaming requires that multiple holes be punched through the fabric pieces during the sewing/threading process. Thereafter, the seam must be treated so that it is waterproof. This two step process is inefficient because it requires that the stitches be inserted and that the newly made seam, and the requisite holes, be waterproofed in a second step. Further, the thread used to stitch the seam may rot or otherwise degrade over time because of, for example, exposure to ultra violet light, thereby weakening the seam. In laminated fabrics, each thread hole creates an untreated exposed edge where a one fabric layer may start to separate from another layer or from the waterproofing layer. Thus, traditional threading creates hundreds of points where delamination may easily occur, possibly resulting in a poorer quality product.

Therefore, there is a need for a method of seaming garments that does not require the use of traditional stitching/sewing techniques. In particular, there is a need to provide a method for seaming garments that are in the technical outdoor clothing industry, especially those with waterproof qualities, without sewing and without the need for putting needle holes in the waterproof fabric. Further, there is a need to join waterproof fabrics together in a single step in order to reduce labor costs.

SUMMARY OF THE INVENTION

The present invention provides a hot air welding apparatus and related method for accurately and repeatably controlling the drive wheel speed. To afford very precise control of the speed and relative rotation of the drive wheels at all times during the welding process, the present invention is provided with a computer control system and two high torque stepper motors, one for each drive wheel. The computer control system allows the speed and position of the drive wheels to be regulated with a very high accuracy. Further, the computer control system allows the stepper motors to be mounted very close to the drive wheels, thereby eliminating the extensive set of chains and pulleys that are inherent in the welders of the prior art and thus further reducing the inaccuracies brought about by the stretched chains and other elements of the drive chain. The computer control system allows the drive wheel settings to be adjusted while the seam is being welded and further includes an automatic ramp capability, a repeat mode, and a test strip mode. Further, the computer control system is capable of controlling the temperature and volume of air used in the welding process. The invention allows for the welding of fabrics with dissimilar thicknesses and stretch characteristics.

The invention further provides a method for joining fabric pieces, and garments seamed by such methods, particularly fabric pieces for technical outdoor waterproof clothing, without the need for traditionally sewn seams.

Many fabrics used in outdoor technical waterproof/breathable type clothing do not bond well, either to each other or with adhesives. However, traditional sewing is undesirable because holes are put in the waterproof fabrics during sewing. In addition, threads may degrade faster than the fabrics they join, weakening and reducing the life of the garment, and the perforations may weaken the fabric. Further, sewing and then sealing the threaded seams is a more expensive, labor intensive process than a one step seaming process. Material costs are also reduced by the elimination of thread and, in some cases, it also helps cut material costs by eliminating thread and possibly even seam tape if the fabrics are themselves weldable.

The main obstacles to overcome in the development of a stitchless seam in a technical fabric are the properties of the fabric itself. Most technical fabrics are made of nylon, which is not weldable because it melts and shrinks too much to allow the formation of a good bond at the seam. However, other thermal plastic materials, such as polyurethane, polyvinylchloride, polypropylene and polyethylene will bond well with heat.

Further, fabric weave also affects bonding. Most technical fabrics have a tight weave to aid in water repellency. However, a tight weave prevents an adhesive from permeating the fabric and forming strong bonds with the fabric fibers. Adhesive tapes may stick to nylon if the weave of the fabric is loose because the tape can encapsulate the individual fibers of the fabric, but loose weaves may be less water repellent.

To compound the problem further, most technical fabrics are coated or impregnated with a durable water-resistant solution (DWR). DWR's are usually silicone based. Silicone is not a thermal plastic so it will not weld and adhesives will not adhere to it well.

These problems can be overcome if the fabrics are modified in one or more ways. For example, fabrics may be given thermoplastic characteristics. To accomplish this, weldable thermoplastic fibers may be included with the other threads which make up the fabric. Polyurethane threads will work well due to their good welding characteristics, elasticity and abrasion resistance, but other thermoplastics will also work.

Alternatively, fabrics with thermoplastic fibers having good bonding characteristics may be seamed with thermally activated adhesive tape. Though the fabric weave may be too tight for fiber encapsulation, exposed thermoplastic fibers in the fabric will still form a strong surface bond with various adhesives. The preferred seam in this situation is the butt seam. However, prayer, double butt, overlap and other seams will work as well.

Further, the DWR may be formulated to have thermoplastic properties so that it is compatible with the welding process. For example, a polyurethane base may be used instead of a silicone base.

Further, the use of adhesive tapes and modified water-resistant solutions or modified fabrics may be combined.

Alternatively, finished products may be coated with the DWR after the seaming process.

Another alternative is to use a DWR with a low evaporation temperature. The welding apparatus may be configured so that heat causes the DWR to vaporize and evacuate the bonding area the instant before the bond is formed. For example, a reflected blast of heated air that is escaping the point of the weld could accomplish this. Various heat sources may be fitted to the welding apparatus, including, but not limited to a specialized hot air nozzle, steam jet or laser.

DETAILED DESCRIPTION OF THE INVENTION

Apparatus and Method for Joining Fabrics

Figure 1:
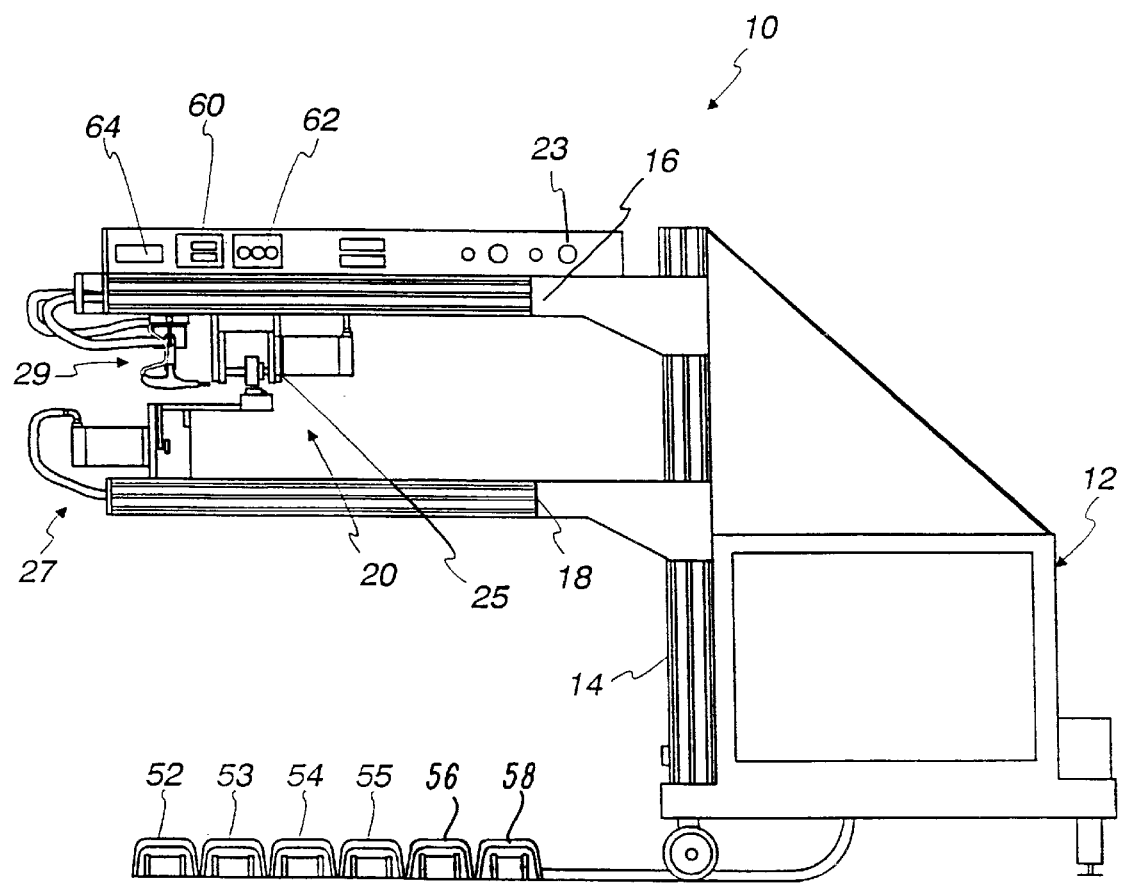
FIG. 1 is a perspective view of the welding apparatus of the present invention.
Figure 2:
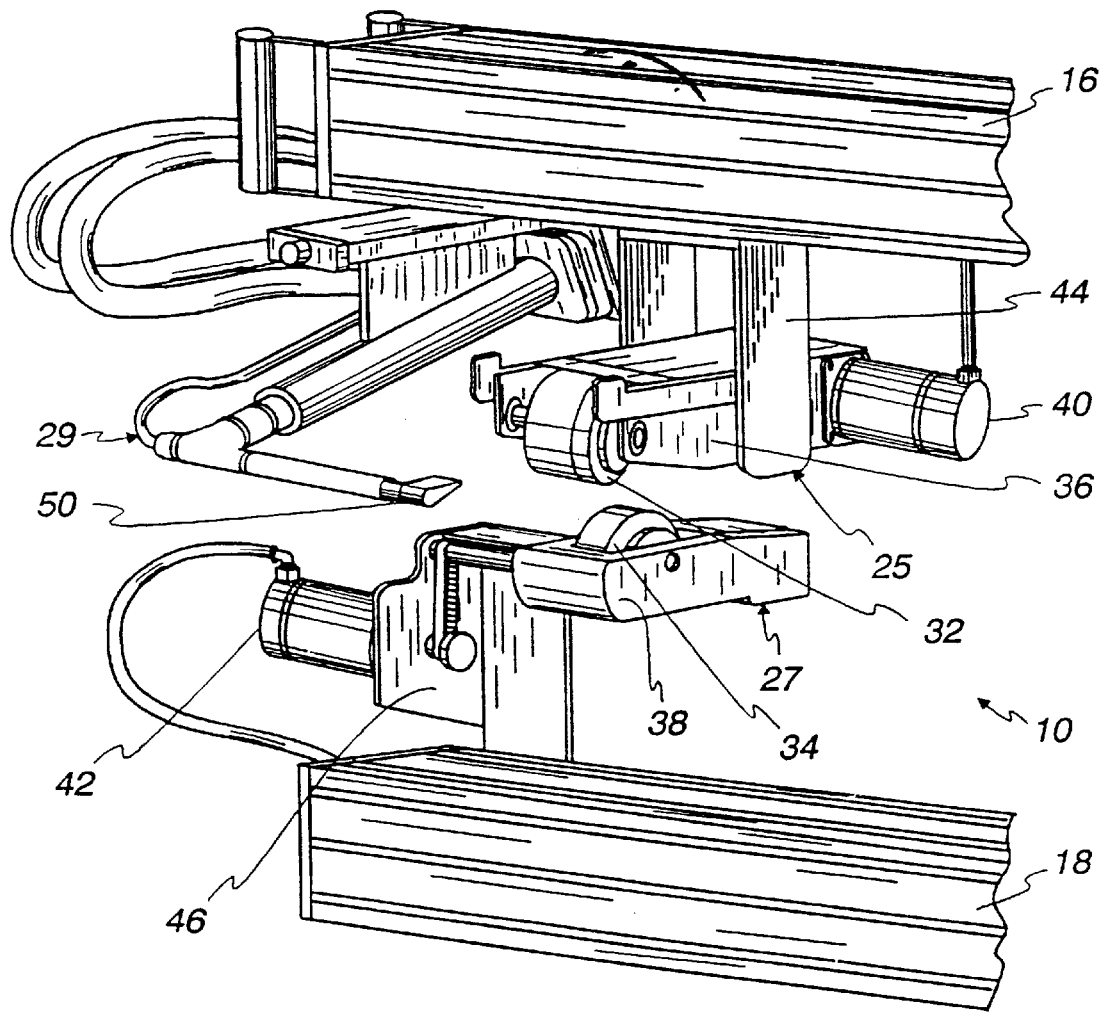
FIG. 2 is a perspective view of the weld head cluster of the present invention.
Figure 3:
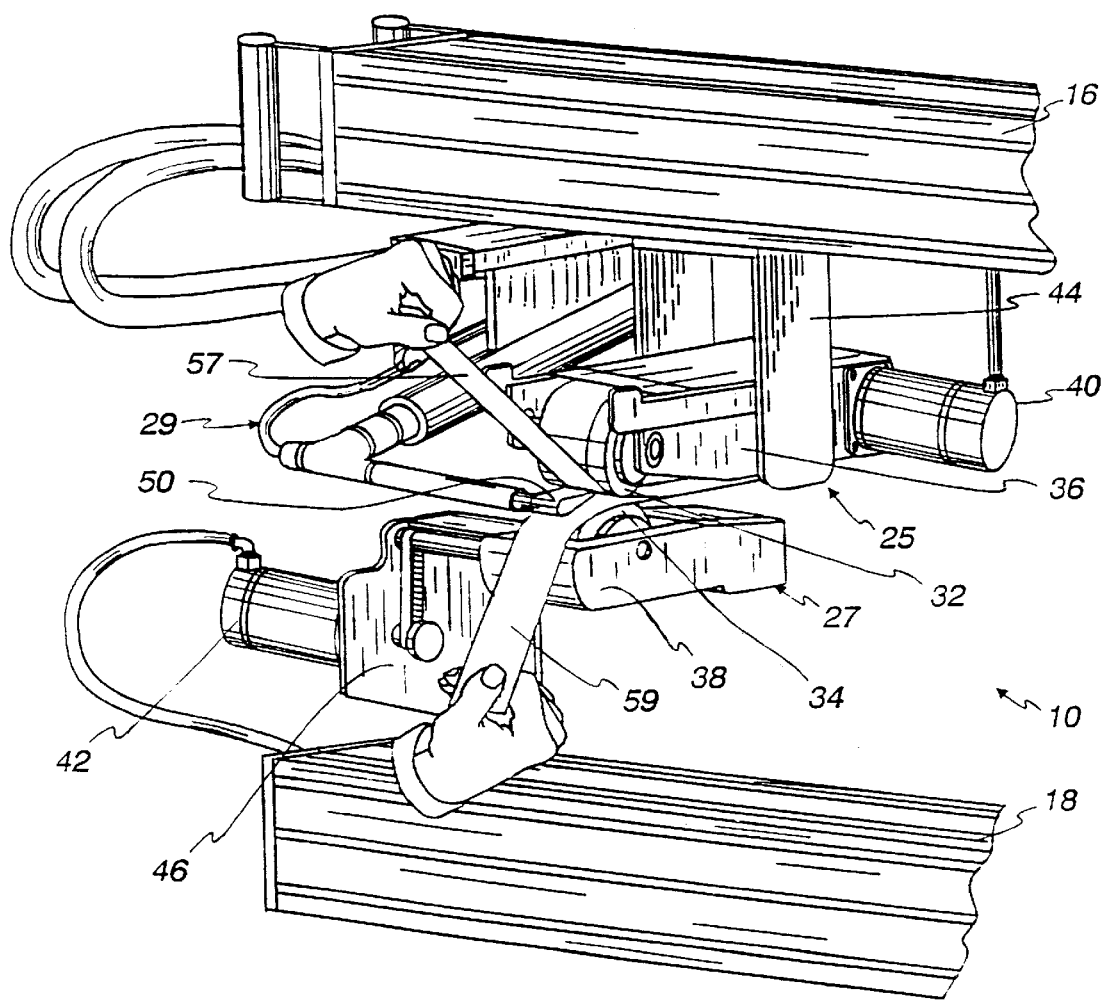
FIG. 3 is a perspective view of the weld head cluster in use.

The rotary hot air welding apparatus 10 of the present invention is shown in FIGS. 1–3. Referring to FIG. 1, the present invention generally includes a cabinet or frame 12, a vertical post member 14, upper and lower beam members 16, 18 extending from the post member 14, and a weld head cluster 20. The upper beam 16 is provided with a computer control module 23 along its upper surface.

The cabinet 12 houses the main power supply for the welding apparatus and the pump for the hot air assembly, discussed below. The cabinet serves as the rigid frame or base that supports all of the other modules of the welding apparatus. It further allows the main power supply to be protected, isolated and distributed throughout the apparatus.

As can be seen generally in FIG. 1 and more specifically in FIG. 2, the weld head cluster 20 includes an upper wheel module 25, a lower wheel module 27 and a hot air assembly 29. In the preferred embodiment, the upper wheel module 25 and the hot air assembly 29 are carried by the upper beam member 16 while the lower wheel module 27 is carried by the lower beam member 18.

Each wheel module includes a drive wheel 32, 34, a housing 36, 38 for housing the drive wheel, a stepper motor 40, 42 operatively coupled to the drive wheel, and a support member 44, 46 for supporting the module from its respective beam member.

Each stepper motor 40, 42 powers a respective drive wheel 32, 34 via an industrial timing belt and a conventional gear arrangement using, for example, simple toothed, in-line gears. Mounting the stepper motors adjacent to the drive wheels enables more accurate control of the wheel speed by eliminating the extensive drive chain and pulley arrangements found in conventional devices.

The hot air assembly 29 of the present invention includes a nozzle 50 for directing the hot air to the seam which is operatively connected to the air pump (not shown) housed in the cabinet 12. A conventional hot air assembly is utilized in the present invention. In the preferred embodiment, hot air is used as the heat source to weld the pieces of fabric together. However, the heat source can alternately take the form of a hot wedge, or a propane flame.

Referring to FIG. 1, the computations necessary to control the air temperature and drive wheel speed occur within the computer control module 23. The main power is supplied from the cabinet 12, converted to the correct phase and voltage, and then is supplied to the computer control module 23.

The computer control system 23 sends accurately timed and amplified pulses to the stepper motors. Since a stepper motor rotates a specific increment of a revolution with each amplified pulse, the control system allows the speed and relative rotation of the drive wheels to be regulated with a very high accuracy during the welding process. The control system, through its operator interface which includes a suitable keypad 60, switches 62, and display 64, also allows the operator to more easily establish and set the exact speed and temperature parameters for the welding process. The present invention is further provided with a set of six foot pedal switches 52–56, 58 which are operatively connected to the computer control system.

Figure 5:
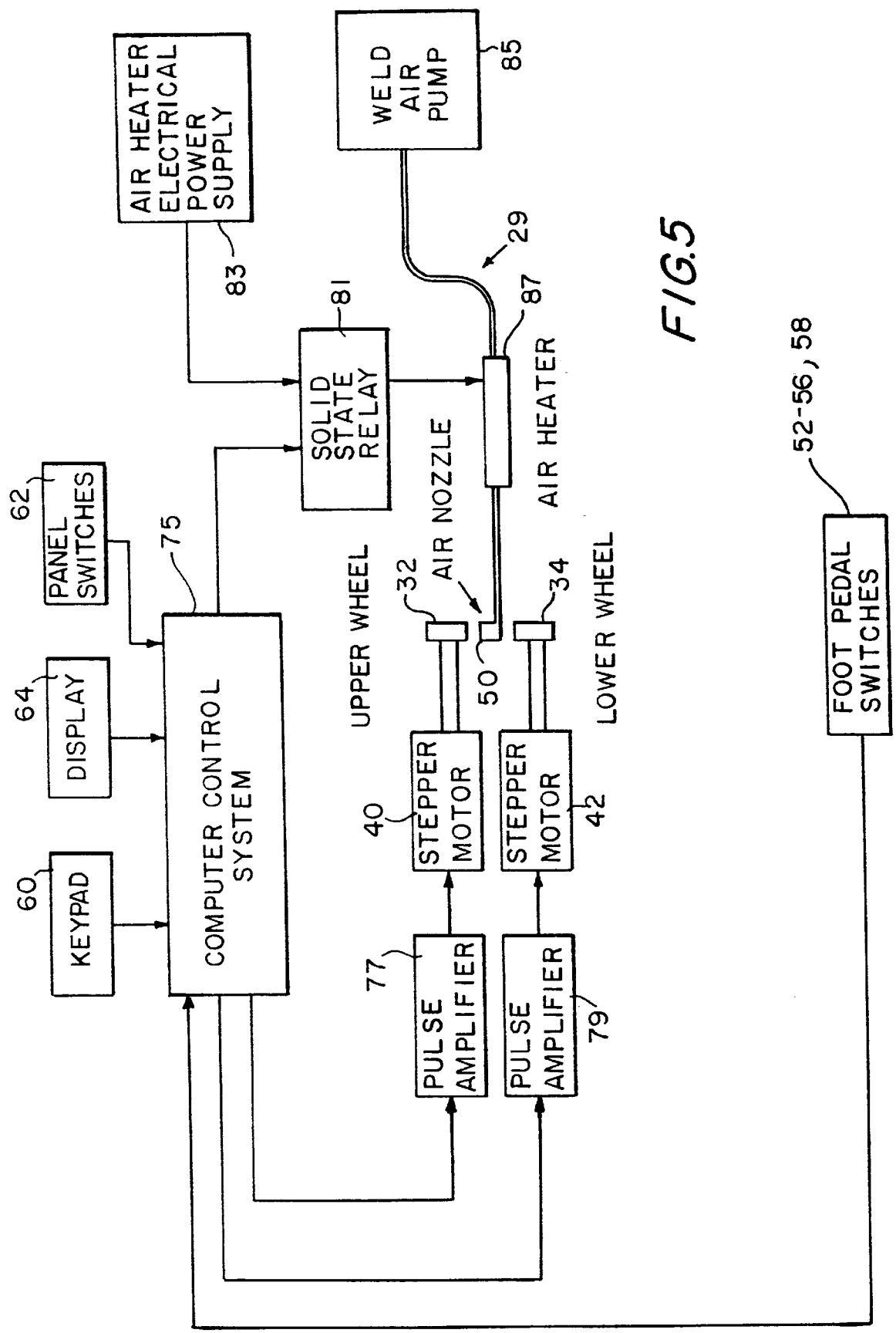
FIG. 5 is a block diagram of the computer control module of the present invention.

FIG. 5 illustrates a block diagram of the inputs and outputs of the computer module 23 used by the present invention. The computer module 23 includes a computer control system 75 that has as its inputs keypad 60, switches 62, and foot pedals 52–56, 58. The data from the inputs is used by the computer control system 75 to control the speeds of the upper wheel module 25, the lower wheel module 27, and the hot air assembly 29 according the principles of the present invention.

The outputs of the computer control system 75 are connected to pulse amplifier 77, 79 that are connected the stepper motors 40, 42, respectively, that control the speeds of drive wheels 32, 34, respectively. Each pulse amplifier 77, 79 inputs a suitable signal to the stepper motors 40, 42 to control the speeds of the drive wheels 32, 34 according to the inputs from the keypad 60, switches 62 and foot pedals 52–56, 58.

The computer control system 75 is also outputted to a solid state relay 81 that controls the hot air assembly 29. The hot air assembly 29 includes an air heater electrical power supply 83, an air pump 85, an air heater 87, and air nozzle 50. The output of the computer control system 75 and the air heater electrical power supply 83 are inputted into solid state relay 81 that controls the air heater 87. The air heater 87 heats air received from the air pump 85. The heated air is then output through the air nozzle 50 to heat the fabric pieces being pinched by the drive wheels 32, 34.

FIG. 3 depicts the present invention in use. In operation, the hot air welding, apparatus 10 of the present invention uses hot air from the hot air assembly 29 to join together two pieces of plastic coated fabric 57, 59. The welder 10 first injects a stream of hot air from the hot air nozzle 50 between the two pieces of coated fabric 57, 59. The fabric pieces 57, 59 are then pinched between and pulled through the welder by the two drive wheels 32, 34, each drive wheel driven by a respective stepper motor 40, 42. The stepper motors 40, 42 move exactly 1/400 a revolution with each amplified pulse from the computer control system. By tracking the number of pulses sent, the control system monitors the speed and relative rotation of the drive wheels. As will be discussed in detail below, the computer control system allows the operator to control the various aspects of the welding process.

An operator can use two of the foot pedals switches 52–56, 58 to give differential wheel speed commands to the control system while steering the pattern pieces through the welding apparatus. Such corrective commands are useful when welding patterns having both curves and straight sections that are best welded by applying differential wheel speed control at particular places on the seam rather than throughout the seam. In the preferred embodiment, the amount of the differential step is applied to one wheel only, for example, the top wheel, is approximately a 1% increase or decrease. The amount represents the incremental change to the top wheel speed that will cause a small but noticeable difference or correction in the panel registration over the next several inches of seam. For example, if the top pattern piece is getting ahead of the bottom piece, the appropriate pedal press will reduce the speed of the top wheel by approximately 1% with respect to the bottom wheel. The operator can give the speed correction command by closing, a foot pedal switch while still keeping both hands on the panels as they, are fed or steered into the weld area of the apparatus. Subsequent foot pedal switch commands produce the same (additive) result.

Wheel speed corrections can also be made for both drive wheels together in exact percentage steps (increase or decrease) of the current wheel speed. This feature is useful when the operator notices that either too much or too little heat is being delivered to the seam while the seam is being welded. In a preferred embodiment, the amount of each step is either an approximate 5% increase or decrease. The amount represents the incremental change to the wheel speed that will result in a small but noticeable difference in seam appearance. The speed correction command is given by closing a foot pedal switch, again allowing the operator to keep both hands on the pattern pieces as they are fed or steered into the weld area of the apparatus. Subsequent foot pedal switch commands produce the same (additive) result.

Some closed patterned products such as tubes build up heat inside the product as a long seam is welded. This heat buildup is caused by an accumulation of hot air inside the tube. To address this problem, the control system of the present invention includes a ramp function. With this ramp function, the operator can command the control system to automatically increase the speed of both drive wheels 32, 34 by a set percentage for each repeating increment of seam, prior to performing a weld. This feature of the control system allows the operator to automatically decrease the amount of heat energy delivered to the seam for those types of seams and panel geometry that tend to accumulate heat over a long seam. This will avoid excessive heat buildup in enclosed patterns with long seams and thus prevent any resultant scorching or burning of the fabric. In the preferred embodiment, the speed increase is adjustable from approximately 0–5% and is imposed on the current wheel speed about every 20 inches of seam.

The computer control system is further provided with a repeat mode which allows the operator to command the apparatus to repeat a set of foot pedal wheel speed corrections that were imposed on the previous seam. In the preferred embodiment, the control system automatically records, for each foot pedal correction event, the type of event and the location it occurred on the seam to an accuracy of approximately 0.1 inch. By placing the control system in repeat mode before welding the next seam, the control system will automatically impose the same foot pedal corrections at the same locations. Thus, the operator can concentrate on steering the panels into the welding apparatus. The use of the repeat mode assumes that the previous series of foot pedal corrections produced the desired weld and that for the subsequent flow of the panels through the machine, the stresses on the panels, and the foot pedal corrections as they were just welded are similar enough for the exact weld to be duplicated. This is the function of the repeat mode. There is a need for such a repeat function when welding panels with rotary heat sealing equipment.

The computer control system is also provided with a test strip mode. Prior to performing a production weld, it is necessary to find the ideal speed and temperature settings for that particular situation. The settings are sensitive to many variables including the type of fabric coating, the welding pressure, the thickness of the fabric, the length of the seam, the operator's proficiency, and external factors such as the relative humidity. An operator can use the test strip mode of the present invention to weld a test strip using scrap fabric of the same type. In this mode, the wheel speed is started at a higher speed than the nominal speed setting and is reduced periodically as the seam is welded. Thus, a welded test strip is produced that can be pulled apart to find where the heat energy was too low to weld and where the heat energy was so high that the panels were distorted or burnt. The optimum speed would lie about half way between those two locations on the test strip. In the preferred embodiment, there are two test strip modes, fine and coarse. For the coarse mode, the starting speed is approximately 50% faster that the nominal setting and the speed decreases by approximately 5% of the nominal setting for every inch of weld. For the fine mode, the starting speed is approximately 10% faster than the nominal speed and decreases by approximately 1% for every inch of weld. The test strip mode of the present invention allows the operator to find the ideal weld speed and thereby assure the highest quality of weld for that set of conditions.

Hot air welders of the prior art deliver a constant temperature air flow to the fabric seam being welded. The speed of the fabric flowing through the machine is controlled to limit the exposure of the fabric to the air stream and thereby maintain an adequate welding process. This constant speed, constant temperature arrangement requires that a complete seam must be welded at the same nominal speed. Thus, if the pattern includes a curved portion and a straight portion, the presence of the curved portion would require that the entire seam be welded at a slower speed. Understandably, this has limited production. The control system of the present invention, however, enables the temperature of the air stream to be changed during welding. The control system can then adjust the wheel speed to keep the welding process at an ideal speed/temperature combination, regardless of the temperature the air stream produces. With this feature, the hot air welder of the present invention can operate much more like a sewing machine in that the operator has some ability to speed up for the long straight sections and to slow down to accommodate any curves in the pattern.

Figure 4:
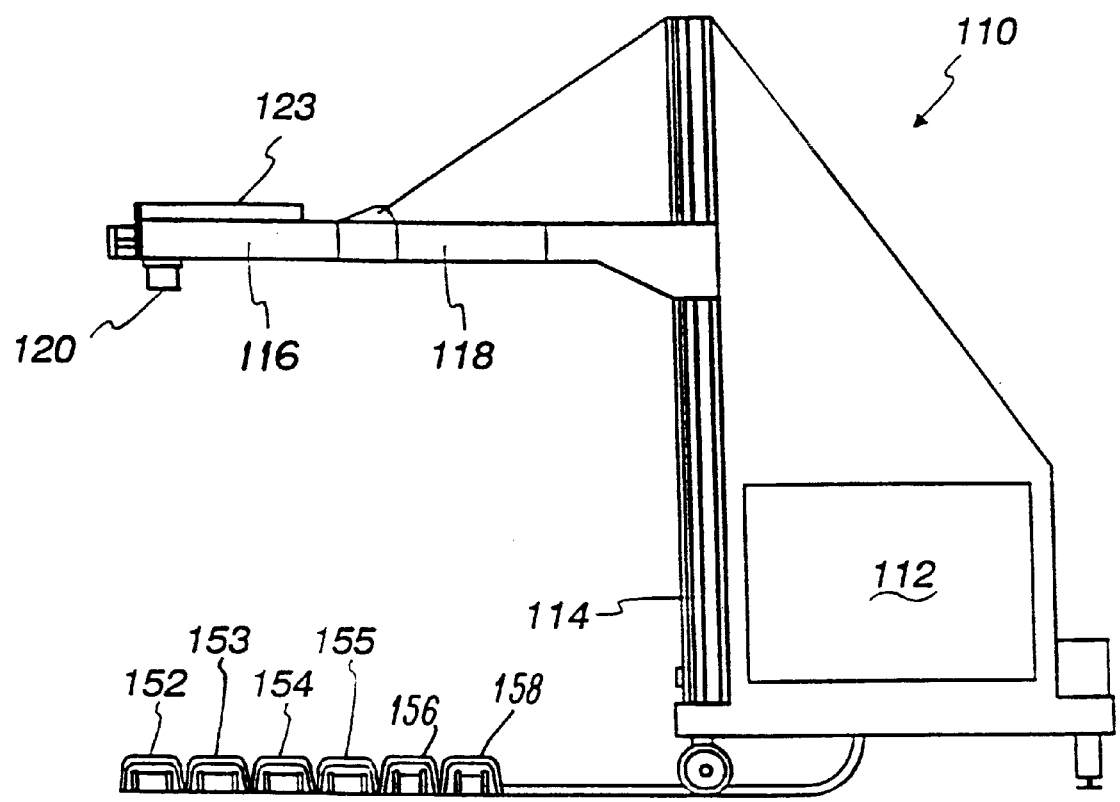
FIG. 4 is a side view of an alternate equivalent embodiment of the present invention.

Of course, the present invention is not limited to the embodiment shown in FIG. 1. An alternate equivalent embodiment of the apparatus shown in FIG. 4 includes an extension 118 between the beam 116 and the post member 114. The height of the post 114 has also been increased in order to provide additional support to the beam 116 and the extension 118. The remaining structure of the rotary hot air welding apparatus 110 shown in FIG. 4 generally corresponds to the structure shown in FIG. 1 and also generally includes a cabinet or frame 112, a weld head cluster 120, a computer control module 123, and foot pedals 152–156, 158. These alternate arrangements allow a wider variety of finished products to be made.

Since the welding apparatus of the present invention is easier to use than welding apparatus of the past, this reduces the stress on the operator by reducing the number of variables that the operator must monitor while welding a seam. Operators, in turn, produce higher quality seams with lower waste from process errors. The present invention also enables fabrics having a very thin coating to be welded successfully. In the past, these fabrics have been difficult or impossible to weld.

Stitchless Seaming

Fabrics used for technical outdoor clothing may be comprised of one or more layers of material. For example, two or three layer fabrics formed of an outer nylon shell, a breathable membrane and, for three layer fabrics, an inner scrim, are common. Single layer fabrics, of nylon, for example, are also common.

The type of fabrics used in the preferred embodiments are waterproof and breathable tri-laminate fabrics from companies such as Gore and Associates (Newark, Del.), Burlington Klopman Fabrics (Greensboro, N.C.), and Torray Industries, Inc. (Tokyo, Japan). These fabrics have a relatively loose weave which aids the bonding process.

However, a variety of synthetic and natural fabrics may be joined according to the method of the invention.

The adhesive tapes used in the preferred embodiments are of various types and are chosen based on the application. For example, monolithic tapes are a single layer of heat activated adhesive, usually with a removable paper backing. Dual sided tapes have a high temperature melt layer and a low temperature melt layer which acts as the adhesive. Some tapes have a scrim or a breathable membrane as a backing for the adhesive.

The equipment used in the preferred embodiments is a Seamtek International SMARTSEAL (™) ROTARY HOT AIR WELDER, Model SP. The welder was configured as a taping machine according to the parameters detailed in the preferred embodiments. Some of the tape/fabric combinations required the upper wheel of the SMARTSEAL (™) welder to run at a slightly different speed that the lower wheel to remove wrinkles or other distortions. As detailed above, this feature is incorporated into the welding apparatus.

Prayer Seam

Figure 6:
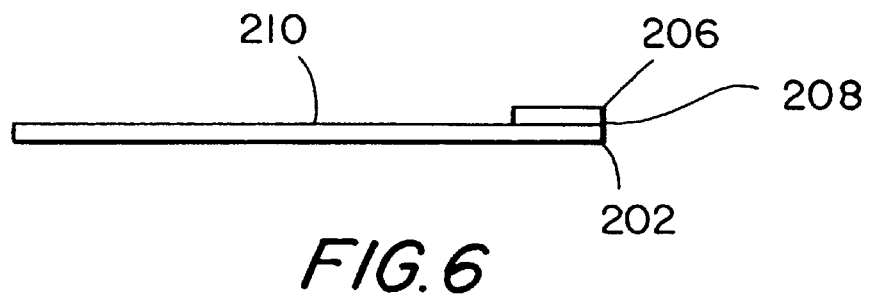
FIG. 6 is a schematic showing an adhesive tape bonded to a piece of fabric.
Figure 7:
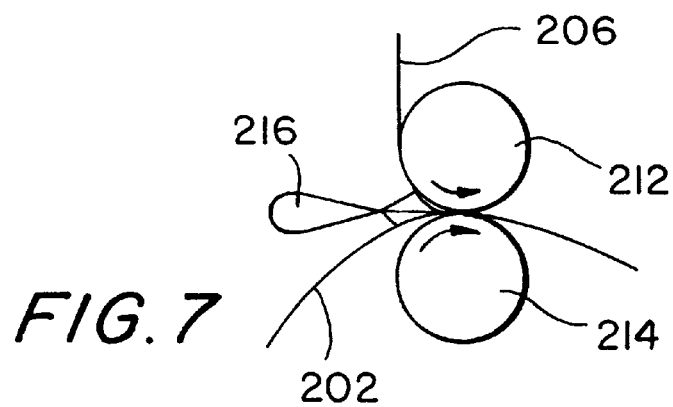
FIG. 7 is a schematic showing an apparatus for bonding adhesive tape to a piece of fabric.

In this embodiment a monolithic heat activated seam tape was used to bond pieces of the garment pattern with heat. Using a SMARTSEAL (™) welder to apply heat and pressure, the tape was bonded to the first piece of fabric. Referring to FIG. 6, a first piece of two or three layer fabric 202 is shown with a piece of heat activated adhesive tape 206 attached to the edge 208 of the fabric outer surface 210. FIG. 7 shows how the attachment of the tape was accomplished with the weld wheels 212, 214 positioned to press the fabric 202 and the tape 206 together after heat is applied by the hot air nozzle 216.

Figure 8:
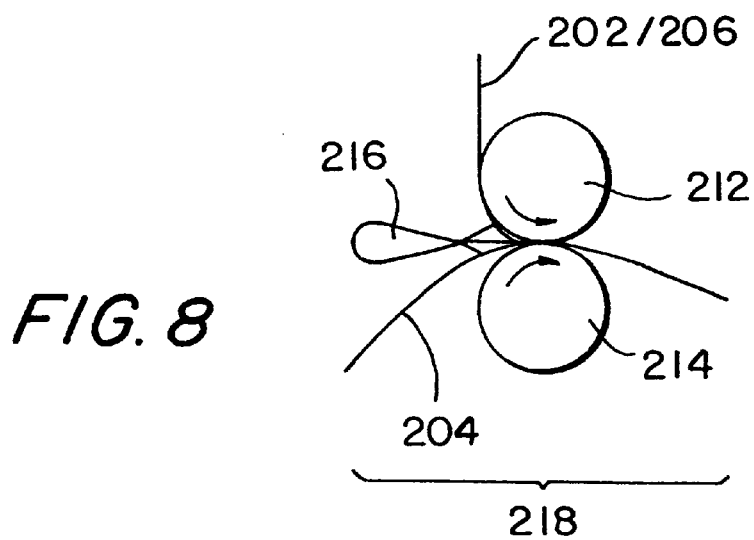
FIG. 8 is a schematic showing an apparatus for bonding a second piece of fabric to the prebonded fabric-tape intermediate product.
Figure 9:
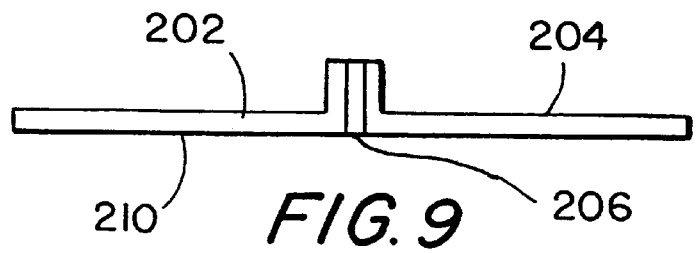
FIG. 9 is a schematic showing seamed fabric pieces.

FIG. 8 shows the arrangement used to adhere the second piece of fabric 204 to the tape 206 which is already bonded to the first piece of fabric 202. This is accomplished by running both pieces of fabric through the welder 218 so that the heat activated adhesive is reactivated and bonded to the second piece of fabric 204. The result of the second welding operation is shown in FIG. 9.

To increase the strength and waterproof qualities of the seam a second piece of tape, or cover tape 220 was applied to the inside surface 222 of the fabric over the prayer seam 224. This tape also makes the prayer seam 224 lay down flat for the comfort of the individual wearing the garment. The cover tape 220 may be a seam tape that is currently used in the industry to seal stitched seams, and may have a backing similar to the inside surface material of the fabric to which it is being bonded.

Figure 10:
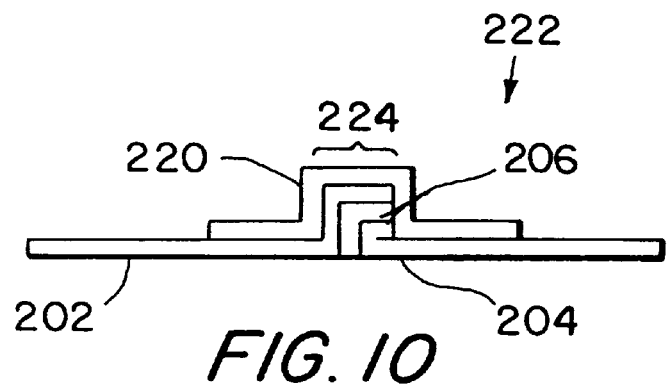
FIG. 10 is a schematic showing seamed fabric pieces with a cover tape added.

Though the seam shown in FIG. 10 appears to be bulky, it is less that ⅛" thick from the inside of the fabric to the outside of the fabric.

Machine Parameters

Temperature: 900° F.

Speed: 60 IPM (inch per minute)

Airflow: 100 scfh (standard cubic feet per hour) (air flow must be set low so the adhesive is not blown away when it becomes liquid)

Weld Pressure: 40 psi (pounds per square inch)

Wheel Type: Silicone 1" wide top and bottom

Wheel differential: +2% (depending upon fabric and tapes used)

Nozzle type: SMARTSEAL (™) Adjustable Taping Nozzle, set to ⅞".

Seam Width: ⅞"
Clamp Pressure: 15 psi

Butt Seam

Figure 11:
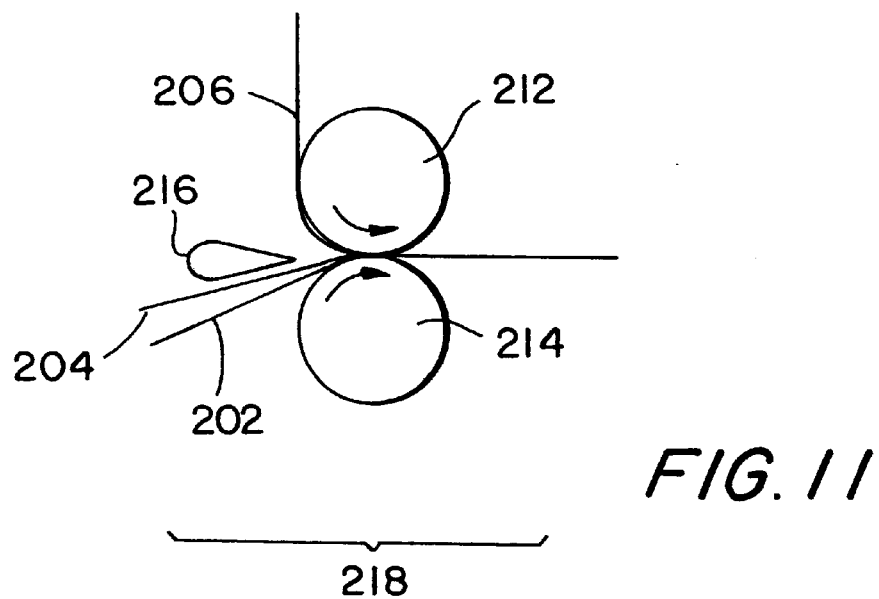
FIG. 11 is a schematic showing an apparatus for bonding two pieces of fabric with an adhesive tape.
Figure 12:
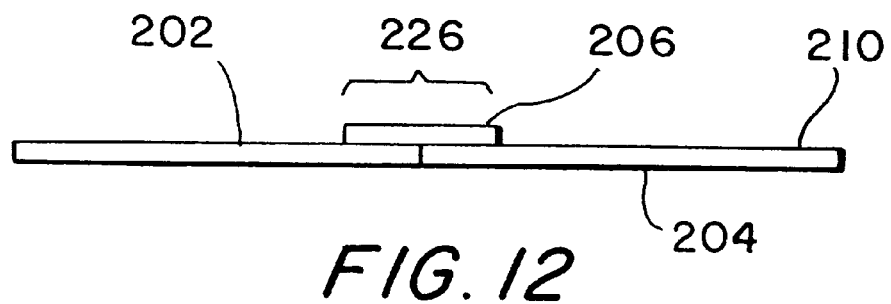
FIG. 12 is a schematic showing seamed fabric pieces.

Another type of seam that can be used to join fabric pieces for technical outdoor garments is the butt seam. In this process, as shown in FIG. 11, the two pieces of fabric 202, 204 are put through the welder 218 simultaneously with the heat activated seam tape 206. In this embodiment, the tape has a nylon fabric backing that matches the outer nylon shell of the fabric pieces being used. FIG. 12 shows the finished butt seam 226, created when the fabric pieces 202, 204 are brought together and the tape 206 is bonded to both pieces simultaneously.

Figure 13:
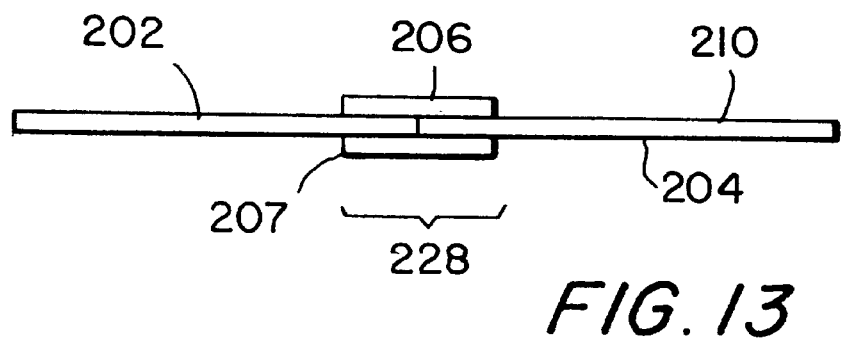
FIG. 13 is a schematic showing fabric pieces seamed with adhesive tape on the inside and the outside surfaces of the fabric.

Machine Parameters
Temperature: 900° F.
Speed: 80 IPM
Airflow: 250 scfh
Weld pressure: 60 psi
Wheel type: silicone 1" wide top and bottom
Nozzle type: SMARTSEAL (™) Adjustable Taping Nozzle, set to ⅞".
Seam Width: ⅞"
Clamp Pressure: 15 psi Double Tape Butt Seam The Double Tape Butt Seam is similar to the Butt seam. The difference, as shown in FIG. 13, is that in the Double Tape Butt Seam 228 a second piece of tape 207 is added to the inside of the fabric pieces in a second bonding operation. The second tape 207 is also a heat activated seam sealing tape and may be chosen so that it matches the material of the inside surface of the fabric pieces and may be a tape that is commonly used to seal stitched seams. For example, if the inside of the fabric is a tricot scrim then the tape 207 could have a backing that is made of the same tricot material so that the final product has a better finished appearance. The second tape increases seam strength and water resistance.

Figure 14:
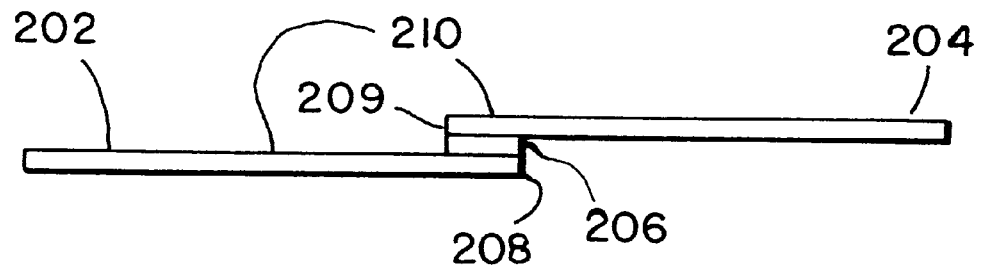
FIG. 14 is a schematic showing seamed fabric pieces.

Machine Parameters
Temperature: 900 F.
Speed: 80 IPM
Airflow: 250 scfh
Weld pressure: 60 psi
Wheel type: silicone 1" wide top / Steel 1" wide bottom
Wheel differential: +1 or 2% (depending upon fabric and tapes used)
Nozzle type: SMARTSEAL (™) Adjustable Taping Nozzle, set to ⅞".
Seam Width: ⅞"
Clamp Pressure: 15 psi Overlap Seam The Overlap Seam is similar to the prayer seam. In this embodiment one piece of fabric had a monolithic heat activated adhesive tape applied to it, as in the prayer seam. Then both fabric pieces were put through the welder again to reactivate the tape so that it bonded to the second piece of fabric. The resulting structure is shown in FIG. 14. The difference between the prayer seam and the overlap seam is that in the prayer seam the tape adheres to the outside of both fabrics (See FIG. 9), where in the overlap seam the tape adheres to the outside of one fabric and the inside of the other fabric. One problem that may arise with the overlap seam is that the edge 209 of the second (outer) fabric 204 is left exposed. However, the edges 208, 209 of the fabric pieces are generally sealed closed during the bonding operation by the heat and pressure applied to the fabric. Further, any excess material, such as frayed edges, will generally be removed by the bonding operation.

Optionally, the outer fabric edge 209 may be folded into the weld so that tape bonds to the turned in edge of the outer fabric.

Figure 15:
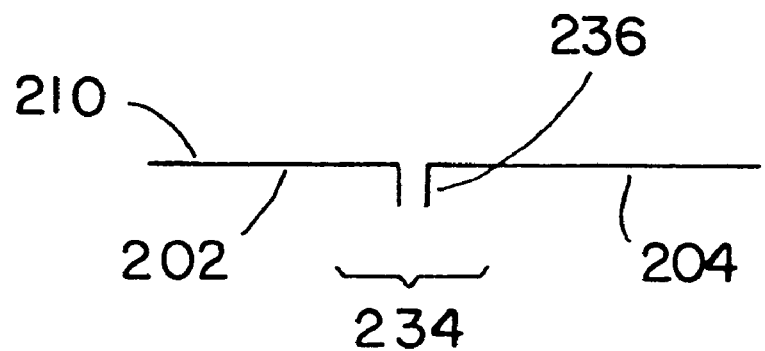
FIG. 15 is a schematic showing fabric pieces bonded without adhesive.

Machine Parameters
Temperature: 900 F.
Speed: 80 IPM
Airflow: 250 scfh
Weld pressure: 60 psi
Wheel type: silicone 1" wide top and bottom
Nozzle type: SMARTSEAL (™) Adjustable Taping Nozzle, set to ⅞".
Seam Width: ⅞"
Clamp Pressure: 15 psi Prayer Seam Without Adhesive FIG. 15 shows a Prayer Seam 234 which bonds the fabric pieces without the need for sewing or an adhesive. The fabric pieces are run through the SMARTSEAL (™) welder and thermoplastic fibers incorporated into the fabric pieces will melt and bond to one another to form a seam. Bonding takes place at point 236.

In this embodiment an appropriate fabric will be comprised of at least some bondable thermoplastic fibers. The exact amount of thermoplastic fibers used in the fabric can be adjusted so that the final product has strong bonds and appropriate water resistant characteristics.

Method for Seaming DWR Treated Fabrics

Figure 16:
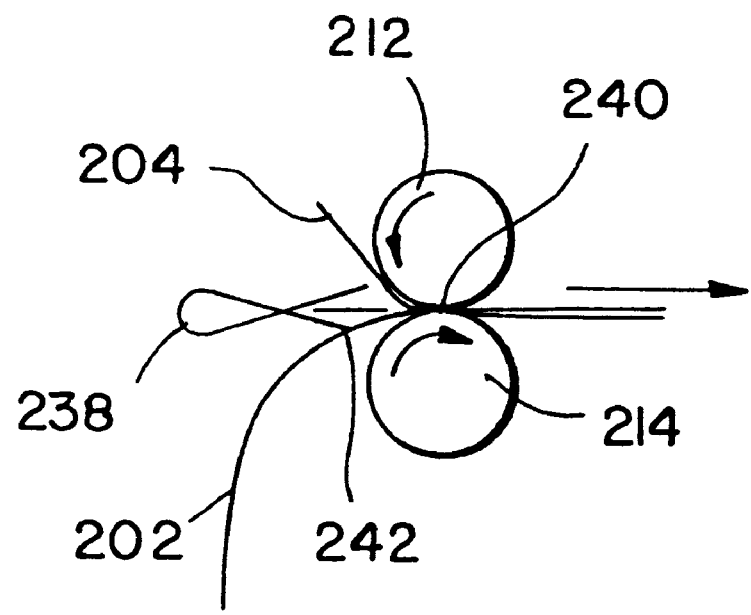
FIG. 16 is a schematic showing an apparatus for seaming fabric pieces that were treated previously with a durable water-resistant solution.

FIG. 16 shows a method for bonding pieces of fabric without stitching even after the fabric has been treated with a DWR solution which has poor bonding characteristics. As the pieces of fabric 202, 204 approach the weld wheels 212, 214 they are exposed to a heat source 238, such as a hot air nozzle, steam jet or laser which vaporizes and evacuates the DWR on the fabric while partially melting the thermoplastic fibers in the fabric. The DWR solution evaporates at about point 242. The fabric is then compressed between the weld wheels 212, 214. Thermal bonding occurs at point 240. Various types of seams may be formed in this manner.

Discussion of Machine Settings

Air temperature: is dependent on adhesive melt point and the speed at which the fabric travels through the machine. Airflow changes also affect the amount of heat delivered to the tape/fabric.

Speed: was 60–80 inches per minute in the preferred embodiments. Faster speeds are possible for production. The maximum speed is dependent upon the adhesive melt points, temperature of the air and the rate of airflow.

Airflow: must be controlled to prevent cold spots on the tape, to prevent the adhesive from being blown away by the force of the heated air and to prevent burning of the tape. Generally, the highest possible airflow is used. In the preferred embodiments an airflow of approximately 100–200 scfh was used due to the low speeds employed. Higher airflow rates may be necessary at higher production speeds. Both airflow volume and pressure can be controlled. In the preferred embodiments, when the airflow rate was below 200 scfh the power limiting in temperature controller was be set to 80%.

The temperature controller unit has a functional setting that allows the operator to control both the dwell (length of time), frequency and intensity of the pulse energy that it sends to the heating element. Airflow and temperature may be controlled with standard devices known in the industry or may be controlled by the computer control module of the present invention. Thus, for example, a setting of 80% means that the heating element will receive pulses from the controller at a 20% lower power differential than a setting of 100% (baseline). The controller can be set higher or lower than the baseline of 100%.

Weld Pressure: was set at 40–60 psi. This adjustment is affected by the thickness of the adhesive on the tape. The higher the pressure the further the adhesive spreads out. To meet appearance requirements the adhesive must stay within the confines of the backing material for tapes that remain exposed. During the time that the welding or taping operation is not in progress, the pressure exerted by the wheels on the material may be reduced so that it is merely sufficient to hold the fabric in place. This is generally referred to as the clamp pressure.

Wheel type: Selection of an appropriate wheel type is important. Wheel width must match or be wider than tapes to ensure uniform pressure of the entire surface of the tape. Silicone wheels were used in all of the preferred embodiments to help prevent adhesives from sticking to wheels and to conform to seam profiles. A steel wheel may be used on the lower wheel module to help drive the molten adhesive deep into the scrim of three layer fabrics.

Wheel Differential: is often critical to the formation of a good seam. To remove wrinkles or adjust for situations where a tape stretches more or less than a piece of fabric, or where two pieces of fabric have dissimilar thicknesses and/or stretch characteristics, the upper wheel must run at a slightly different speed than the lower wheel. For example, when a stretch fabric is used with a non-stretch tape one wheel may need to run at a different speed than the other wheel in order to prevent bunching of the tape or fabric. Similar registration problems may be encountered even in fabrics that generally are considered to be non-stretch fabrics if pattern pieces are joined where one piece is cut along the bias and another was cut across the bias because the fabric pieces will still, to some degree, stretch differently.

Nozzle Type: The SMARTSEAL (™) welder is provided with both taping nozzles and welding nozzles for various applications.

Seam Width: may vary between about ¼"–2" depending on the application.

Other Alternative Embodiments

By making use of adhesive tapes, fabrics containing at least some bondable fibers, bondable DWR coatings and loosely woven fabrics, either individually or in various combinations, such as, for example, adhesive tapes combined with fabrics containing bondable fibers, various technical garments can be seamed without the need for traditionally sewn seams.

Extruded Materials Welded to Films

Further, the methods and apparatuses of the invention may be applicable to the joining of extruded thermoplastic materials to films, such as in swimming pool liners, abrasion strips on inflatable boats, window shades and many other applications. The extruded materials and films may be made of numerous thermoplastics including, but not limited to, polyurethane, polyvinylchloride, polyethylene and polypropylene. Since the extruded materials and films are not necessarily made of the same materials and, even if they are made of the same materials, generally, will have different dimensions, thicknesses and elasticity's, the apparatus of the invention will insure that the different materials are joined, usually by welding, at smooth seams.

Helium Envelopes

The invention apparatus may be modified in order to accommodate the joining of materials to create pouches or gores for applications as diverse as helium balloons, blimps or zeppelins.

Figure 17:
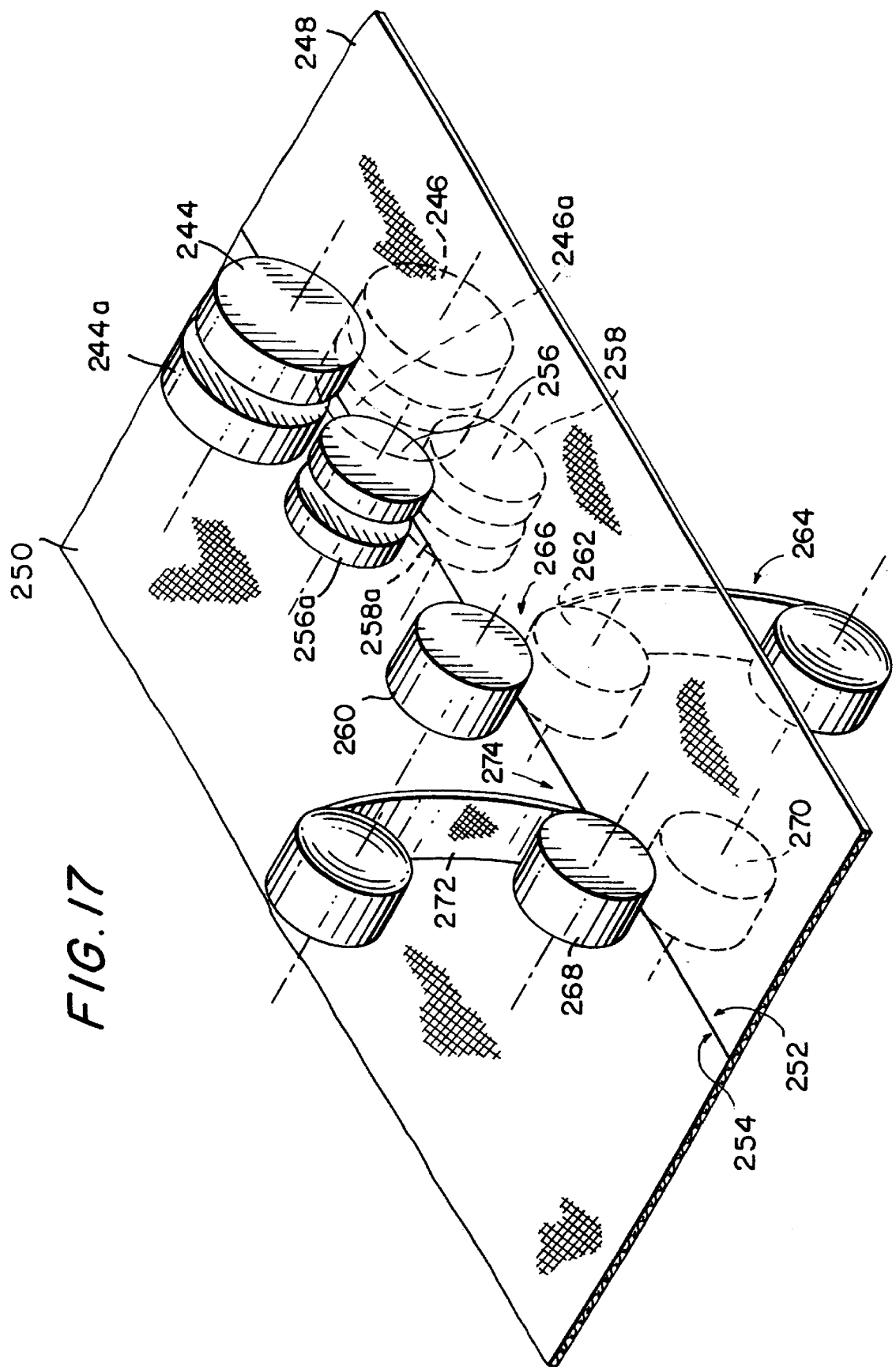
FIG. 17 is a schematic (perspective view) of an alternative embodiment apparatus.
Figure 18:
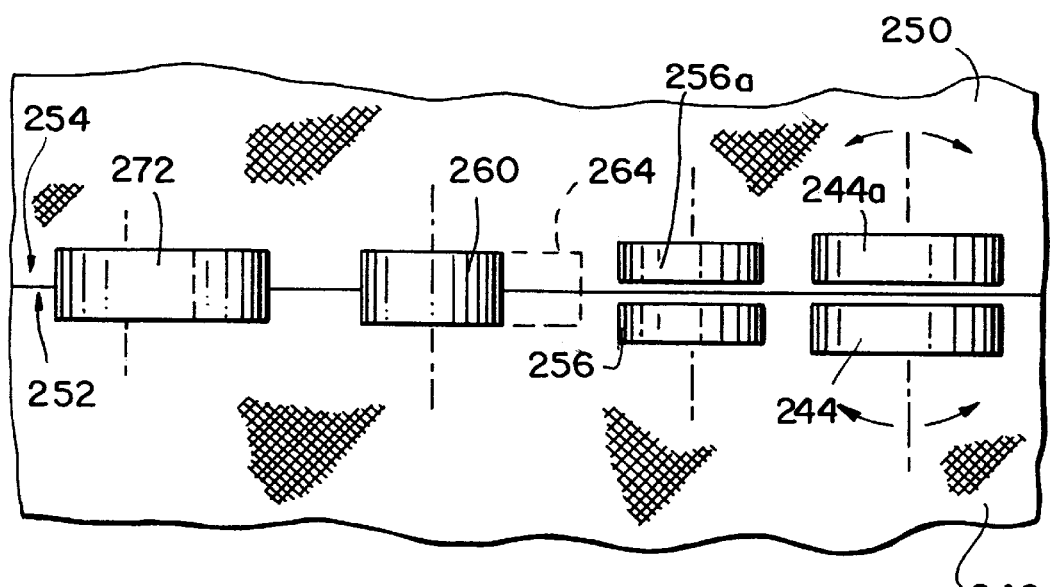
FIG. 18 is a schematic (top view) of an alternative embodiment apparatus.
Figure 19:
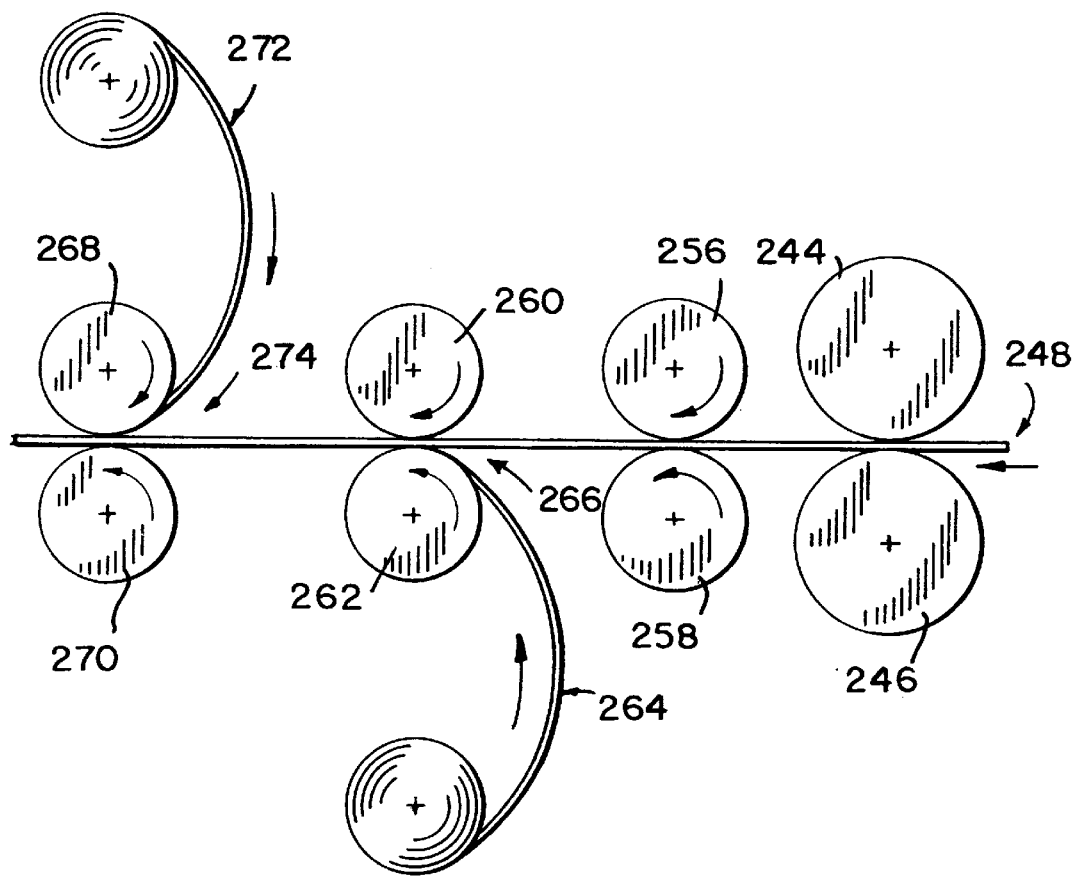
FIG. 19 is a schematic (side view) of an alternative embodiment apparatus.

One preferred embodiment of the invention suitable for such an application is shown in FIGS. 17, 18 and 19. Two pieces of fabric are passed through the welding/taping apparatus of the invention. This embodiment comprises edge sensor wheels 244, 246, 244a, 246a which can be used to track preplaced registration marks on the fabric pieces 248, 250 or the actual edges 252, 254 of the fabric pieces. The sensor wheels assist with the movement and precise alignment of the fabric in either the forward/back or side-to-side directions.

The fabric pieces then continue to pinch rollers 256, 258, 256a, 258a which precisely control forward/back movement and hold the fabric pieces to help facilitate welding or taping. In FIGS. 17, 18 and 19 pinch rollers 256, 258 control a first fabric piece 248 and pinch rollers 256a, 258a control a second fabric piece 250. As the fabric pieces continue they pass between rollers 260, 262 which apply structural tape 264, after heating by a heating element (not shown) at point 266, to the bottom of the fabric pieces to form a butt seam. The fabric pieces then continue further down the line to rollers 268, 270 which apply a finishing tape 272, after the tape is heated by a heating element (not shown) at point 274, to the side of the butt seam opposite the structural tape, thereby forming a double tape butt seam.

In this embodiment, each sensor wheel 244, 246, 244a, 246a may be controlled by one motor (not shown) and moved by its axis (see FIG. 18) so that the fabric movement can be controlled in four directions. Alternatively, sensor wheels are available in the marketplace that have, on their perimeter, smaller wheels whose rotational axis is perpendicular to that of the sensor wheels. This design will be controlled by two motors per sensor wheel and will also allow for movement in four directions. Each pinch roller may also be independently controlled by one motor. Allowing each wheel and roller to be controlled independently allows fabric pieces to be neatly joined even if they are different lengths because the computer control module can automatically adjust for length variations between the two fabric pieces as the welding/taping proceeds. The result is that two pieces of fabric can be neatly joined even if one piece is significantly longer than the other because the computer control module will adjust for the length differences more or less equally across the entire length of the seam. For example, an asymetrical gore can be formed by neatly seaming a 623 foot length of fabric to a 685 foot length of fabric without any bunching. This task would be practically impossible by hand.

As detailed above, data concerning the movements of all wheels/rollers can be stored by the computer control module so that similar welding/taping operations are easily repeated.

Enhanced Memory and Programmability

In addition, the welding/taping apparatus used to seam the fabrics may be further equipped with a programmable memory which retains settings data when a product is produced so that the data can be retrieved and used when an identical product is produced. This feature would allow an operator to do a single programming run and then repeatedly retrieve the data when identical products are being produced. Variable stored in a programmable memory could include: machine configuration, fabric vendor, product ID, lot number, material color, coating weight, coating type, coating method, scrim material, scrim weave weight, scrim weave ounces (i.e. denier), temperature, upper wheel speed, lower wheel speed, air volume, nozzle size, nozzle type, nozzle position, heater power setting, weld pressure, weld type, wheel sizes for upper and lower wheel modules, wheel types for upper and lower wheel modules, whether or not a ramp was used and, if used, the percentage of change. Other variables may also be recorded by the programmable memory.

It should be understood that various changes and modifications to the preferred embodiments described herein will be apparent to those skilled in the art. For example, the use of stepper motors to achieve the high accuracy and repeatability of the system could alternately be achieved by using a traditional DC servomotor system with an encoder feedback to the computer control system. Such changes and modifications can be made without departing from the spirit and scope of the instant invention and without diminishing its attendant advantages. It is therefore intended that such changes and modifications be covered by the appended claims.

What is claimed is:

1. A method for welding two panels of industrial textiles together to form a seam comprising the steps of:
   (a) feeding the panels through a weld head cluster, the weld head cluster having an upper drive wheel module, a lower drive wheel module, and a hot air assembly, wherein the upper drive wheel module is positioned above the lower drive wheel module to form a pinch area therebetween into which the two panels are fed in movement driven by the drive wheels, each drive wheel module including a drive wheel and a motor for providing power to drive the respective drive wheel;
   (b) applying heat to the panels from the hot air assembly which is positioned in front of the pinch area to apply heat from hot air to the two panels to form a seam thereof;
   (c) controlling the welding of the seam with an operator input means which allows controllable adjustment and changing of differential wheel speeds of the drive wheels relative to each other during a seam operation by causing the control means to output an upper drive wheel control signal and a lower drive wheel control signal for controlling the respective drive wheels independently of each other, such that the control means is capable of making differential wheel speed corrections to the respective drive wheels while the seam is being welded in order to control the movement of the panels into the bite area and, thereby, the amount of heat being delivered to the seam, and the operator input means including switch means for providing commands regarding wheel speed corrections to be made from an operator to the control means.

2. The method of claim 1 wherein each motor rotates a respective drive wheel a specific increment of a revolution with each amplified pulse from the control means.

3. The method of claim 1 wherein the wheel speed correction comprises an increase in the speed of both drive wheels by a set percentage for each repeating increment of seam.

4. The method of claim 1 wherein the wheel speed correction comprises a decrease in the speed of both drive wheels by a set percentage for each repeating increment of seam.

5. The method of claim 1 wherein the control means is capable of making wheel speed corrections to only one drive wheel by a set percentage while the seam is being welded for situations where one panel of material is pulling ahead or dropping behind another panel.

6. The method of claim 1 wherein the wheel speed correction comprises an increase in the speed of both drive wheels by a set percentage for each repeating increment of seam in order to decrease the amount of heat energy delivered to the seam.

7. The method of claim 1 wherein the control means includes a ramp function.

8. The method of claim 1 wherein the control means includes a repeat mode.

9. The method of claim 8 wherein the control means records each wheel speed correction, the type of correction and the location of the correction of a previous seam.

10. The method of claim 9 wherein, in response to a command issued by the operator, the control means performs the recorded wheel speed corrections at the same locations as occurred during the previous seam.

11. The method of claim 1 wherein the control means includes at least one test strip mode.

12. The method of claim 11 wherein the wheel speed is started at a higher speed than the nominal speed setting and is reduced periodically as the seam is welded.

13. The method of claim 12 wherein the starting wheel speed is 50% faster than the nominal speed setting and the speed decreases by 5% of the nominal setting of every inch of weld.

14. The method of claim 12 wherein the starting wheel speed is 10% faster than the nominal speed setting and the speed decreases by 1% of the nominal setting of every inch of weld.

15. The method of claim 1 further including a temperature control function.

16. The method of claim 15 wherein the control means is capable of controlling the temperature of the air delivered from the hot air assembly to the seam.

17. The method of claim 1 wherein each drive wheel module further includes a timing belt and a gear arrangement for providing power from the motor to the drive wheel.

18. The method of claim 1 wherein the motor is a DC servomotor system.

19. The method of claim 1 wherein the control means has a memory, and the memory retains data when a product is produced so that the data can be retrieved when an identical product is produced.

20. A rotary hot air welding apparatus for welding two panels of industrial textiles together to form a seam comprising:
   a weld head cluster having an upper drive wheel module, a lower drive wheel module, and a hot air assembly, wherein the upper drive wheel module is positioned above the lower drive wheel module to form a pinch area therebetween into which the two panels are fed in movement driven by the drive wheels, and the hot air assembly is positioned in front of the pinch area to apply heat from hot air to the two panels to form a seam thereof;
   each drive wheel module including a drive wheel and a motor for providing power to drive the respective drive wheel;
   a control means for controlling the welding of the seam having an operator input means for controllably adjusting and changing differential wheel speeds of the drive wheels relative to each other during a seam operation by causing the control means to output an upper drive wheel control signal and a lower drive wheel control signal for controlling the respective drive wheels independently of each other, such that the control means is capable of making differential wheel speed corrections to the respective drive wheels while the seam is being welded in order to control the movement of the panels into the bite area and, thereby, the amount of heat being delivered to the seam; and
   the operator input means including switch means for providing commands regarding wheel speed corrections to be made from an operator to the control means; and
   wherein the control means has a memory, and the memory retains data when a product is produced so that the data can be retrieved when an identical product is produced.

21. A method for joining a first and a second piece of fabric for use in technical clothing, comprising:
- (a) heating a thermally activated adhesive tape,
- (b) applying pressure to the tape and said first piece of fabric so that they bond,
- (c) reheating the thermally activated adhesive tape, and
- (d) applying pressure to said first piece of fabric, the tape, and said second piece of fabric so that the tape bonds to said second piece of fabric and a seam is formed.

22. The method of claim 21, wherein said bonding creates a prayer seam.

23. The method of claim 22, wherein a cover tape is bonded to the prayer seam.

24. The method of claim 21, wherein said bonding creates an overlap seam.

25. The method of claim 21, wherein said pieces of fabric are subsequently treated with a durable water-resistant solution.

26. A method for joining a first piece and a second piece of fabric for use in outdoor clothing, wherein said fabric pieces have been treated previously with a durable water-resistant solution that does not have good heat-bonding characteristics, comprising:
- (a) heating a thermally activated adhesive tape and said first piece of fabric until the solution vaporizes from said first piece of fabric,
- (b) applying pressure to said first piece of fabric and the adhesive tape until they bond,
- (c) heating the thermally activated adhesive tape and said second piece of fabric until the solution vaporizes from said second piece of fabric,
- (d) applying pressure to said first piece of fabric, the adhesive tape and said second piece of fabric until they bond to form a seam.

27. A method for joining a first piece and a second piece of fabric for use in outdoor clothing, wherein said fabric pieces have been treated previously with a durable water-resistant solution that does not have good heat-bonding characteristics, comprising:
- (a) heating a thermally activated adhesive tape and said first and second pieces of fabric until the solution vaporizes from said pieces of fabric,
- (b) applying pressure to the first and second pieces of fabric and the adhesive tape until they bond to form a seam.

28. The method of claim 26, wherein the heating step is accomplished by use of a heating device selected from the group consisting of a hot air nozzle, a steam jet and a laser.

29. The method of claim 27, wherein the heating step is accomplished by use of a heating device selected from the group consisting of a hot air nozzle, a steam jet and a laser.

30. The method of claim 21, wherein said pieces of fabric have dissimilar stretching characteristics.

31. The method of claim 26, wherein said pieces of fabric have dissimilar stretching characteristics.

32. The method of claim 27, wherein said pieces of fabric have dissimilar stretching characteristics.

33. The method of claim 21, wherein the tape and at least one piece of fabric have dissimilar stretching characteristics.

34. The method of claim 26, wherein the tape and at least one piece of fabric have dissimilar stretching characteristics.

35. The method of claim 27, wherein the tape and at least one piece of fabric have dissimilar stretching characteristics.

36. A garment comprising at least a first and a second piece of fabric, wherein at least said first piece of fabric and said second piece of fabric are joined at a seam created by the method of claim 21.

37. A garment comprising at least a first and a second piece of fabric, wherein at least said first piece of fabric and said second piece of fabric are joined at a seam created by the method of claim 26.

38. A garment comprising at least a first and a second piece of fabric, wherein at least said first piece of fabric and said second piece of fabric are joined at a seam created by the method of claim 27.

* * * * *